United States Patent [19]
Kyle, Sr.

[11] 3,815,214
[45] June 11, 1974

[54] METHOD FOR CONNECTING PIPE TO A MANHOLE

[76] Inventor: John V. Kyle, Sr., 4 LaVista - Perimeter Office Pk., Suite 144, Tucker, Ga. 30084

[22] Filed: May 22, 1972

[21] Appl. No.: 255,714

[52] U.S. Cl............................ 29/450, 61/11, 61/13, 249/11, 249/83, 249/145, 264/274, 285/189
[51] Int. Cl............................................. B23p 11/02
[58] Field of Search.......... 29/450, 453, 525, 157 R; 249/11, 145 X, 83 X, 95; 277/181, 190; 285/189, 158; 264/274; 61/2, 11, 13

[56] References Cited
UNITED STATES PATENTS

| | | | |
|---|---|---|---|
| 1,090,211 | 3/1914 | Hiatt | 249/95 |
| 2,683,298 | 7/1954 | Fadden | 249/145 X |
| 2,955,322 | 10/1960 | Hite | 249/83 |
| 3,363,876 | 1/1968 | Moore | 249/145 |
| 3,415,482 | 12/1968 | Schmidgall | 249/145 |
| 3,759,280 | 9/1973 | Swanson | 285/158 X |
| 3,788,080 | 1/1974 | Washabaugh et al. | 29/158 R X |

Primary Examiner—Charlie T. Moon
Attorney, Agent, or Firm—Raphael Semmes

[57] ABSTRACT

A manhole is provided with a precast opening of precise dimensions and has a resilient O-ring gasket cast in situ medially thereof. A sewer pipe is fitted with a connector section on the end thereof, said section having a smooth cylindrical exterior of substantially uniform diameter. The connector section is receivable in the manhole connector opening, and the arrangement and method allow latitude to the location of the manhole while providing a flexible but tightly sealed joint.

8 Claims, 6 Drawing Figures

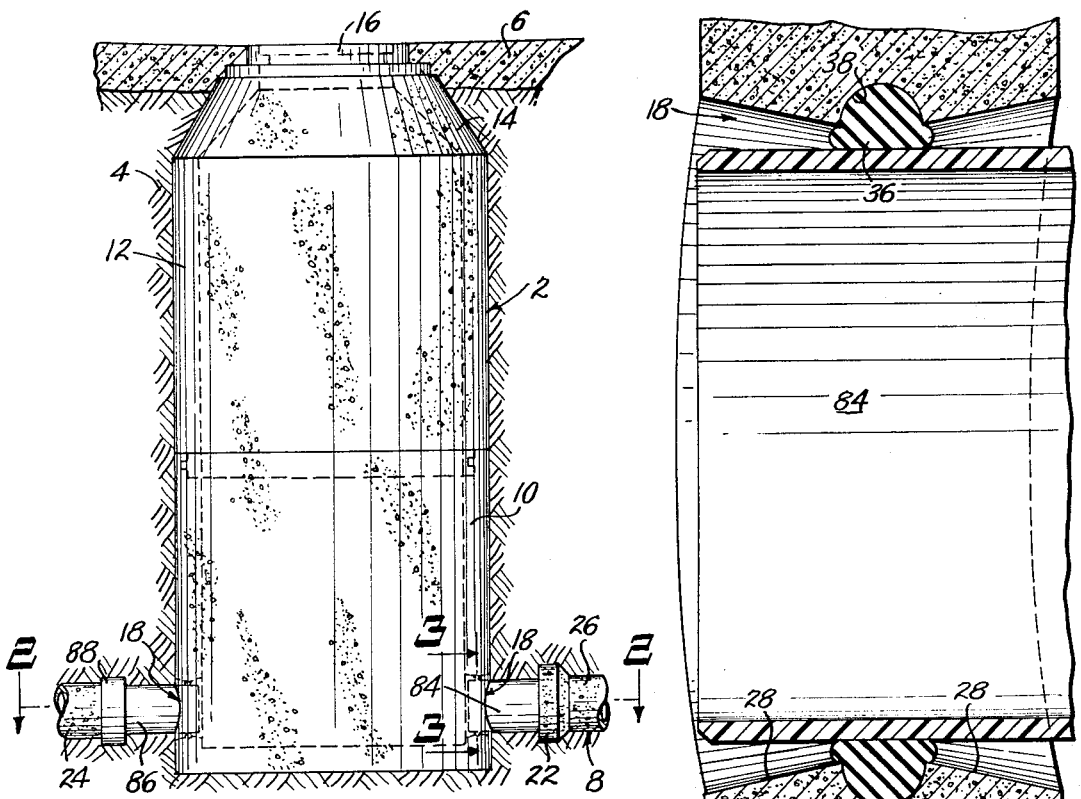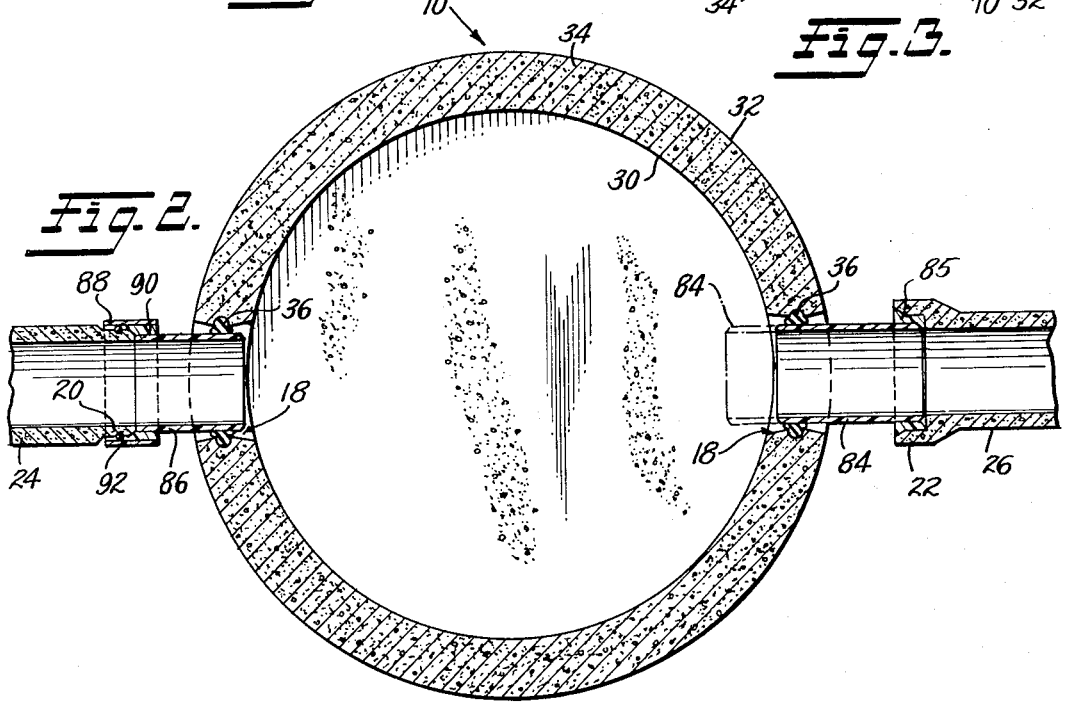

METHOD FOR CONNECTING PIPE TO A MANHOLE

BACKGROUND OF THE INVENTION

1. Field of the Invention

The present invention relates generally to the making of joints between a buried manhole and sewer pipes or the like to be connected thereto. More particularly, it relates to an improved arrangement and method for connecting the end of a pipe to a manhole, whereby a flexible joint can be quickly made even if the manhole is not precisely located.

2. Description of the Prior Art

Buried manholes or vaults are commonly used to connect buried sewer pipes and the like at spaced locations along a sewer line, whereby to provide access by maintenance personnel to the sewer lines and for other reasons. The manholes or vaults can be cast in situ, but commonly today they are precast in sections and then installed in a pit dug by workmen. It is primarily to such precast manholes that the present invention relates.

There have been several approaches to joining the ends of sewer pipe to a buried manhole, including the provision of socketed openings in the vault into which the sewer pipe ends are inserted and secured by mortar, complex metal clamping rings, or a combination of these. While the joints resulting from such arrangements are satisfactory once constructed, they often require considerable time and difficulty to make. This is because the precast manhole itself must normally first be positioned with great care so that the sewer pipe openings are precisely located, because of difficulty in cutting and laying the sewer pipe into the manhole, and because of difficulty in assembling the joint components themselves.

There is thus need for an arrangement and method for joining the ends of buried pipe to a manhole wherein precise location of the manhole is not required, and whereby a joint can be easily and quickly made. The present invention is directed toward satisfying that need.

SUMMARY OF THE INVENTION

In the present invention the lower concrete section of a manhole has openings formed in the wall thereof for receiving the ends of pipe to be joined thereto. The pipe openings are formed during manufacture of the concrete manhole section by mounting a two-part blind between the concentric inner and outer molds used to form the section, the blind being constructed to carry a resilient O-ring seal at the juncture of the two parts thereof. The two blind parts are frusto-conical and taper downwardly from the outer ends thereof toward the O-ring seal mounting groove formed at the abutting ends thereof.

After the manhole section has been poured and the concrete has hardened, the inner and outer concentric molds are removed, and the two parts of the blind are removed. The resultant pipe opening is precisely shaped and comprises two outwardly flared portions with a cast in situ O-ring seal disposed therebetween, the sealing ring projecting radially into the pipe opening. The manhole section is then ready for installation into a dug pit in the ground.

The manhole is placed with care so that the pipe openings are generally aligned with the buried pipeline to be connected thereto. However, because the joint of the invention allows for flexibility, some variation in elevation and lateral location of the manhole can be accommodated. Thus, the great care and time normally required to precisely set a manhole in position are lessened with the present invention.

With the manhole in position, the pipeline is laid until within less than a pipe length of the manhole. The final pipe section coming into the manhole is fitted at its manhole end with a smooth surfaced, cylindrical connector section with uniform external dimensions, which connector section can be made of polyvinylchloride (PVC) plastic or a similar suitable material. The final pipeline section is easily installed by first inserting the connector section through the double-flared manhole pipe opening with its cast in situ O-ring seal and then manipulating the pipe section to make the joint at its other end with the pipeline.

The double-flared manhole pipe opening allows for easy manipulation of the smooth pipe connector section, which connector section can freely pivot about the O-ring seal acting as a fulcrum. Thus, installation of the final pipeline section is an easy matter. Moreover, the smooth surfaced and uniform diameter connector section will form an effective seal with the O-ring at any place therealong and over a relative wide number of angular positions for the connector section. This flexibility provides considerable tolerance for the locating of both the manhole and the pipeline, and will absorb without damage to the joint later changes in the relative positions of the manhole and the pipeline such as might be caused by settlement or shifting soil.

To summarize the method of the invention, the first step thereof is to provide a manhole with a pipe opening having a resilient O-ring seal mounted therein, followed by providing one end of a pipe with a connector section having a smooth cylindrical exterior of substantially uniform diameter over the length thereof and the final step of inserting said connector section through said pipe opening to make the joint.

It is the principal object of the present invention to provide an arrangement and method for easily and quickly making a joint between a manhole or vault and a pipe.

Another object is to provide a manhole joint arrangement that can be pre-manufactured and which then requires no tools to install on site.

A further object is to provide a manhole joint arrangement that allows for variations to occur in the relative positions of the manhole and the pipe connected thereto.

Yet another object is to provide a two-part blind for molding a precisely dimensional flared opening in a manhole and equipped to cast an O-ring seal in proper position.

Other objects and many of the attendant advantages of the present invention will become readily apparent from the following Description of the Preferred Embodiment, when taken together with the accompanying drawing.

BRIEF DESCRIPTION OF THE DRAWINGS

FIG. 1 is an elevational view of an installed manhole with two pipe sections connected thereto by the joint arrangement and method of the invention;

FIG. 2 is an enlarged fragmentary horizontal sectional view taken on the line 2—2 of FIG. 1, and showing the joint arrangement of the invention as applied to the male end of one pipe and the female end of a second pipe;

FIG. 3 is an enlarged fragmentary vertical sectional view taken on the line 3—3 of FIG. 1;

DESCRIPTION OF THE PREFERRED EMBODIMENT

Figure 4:
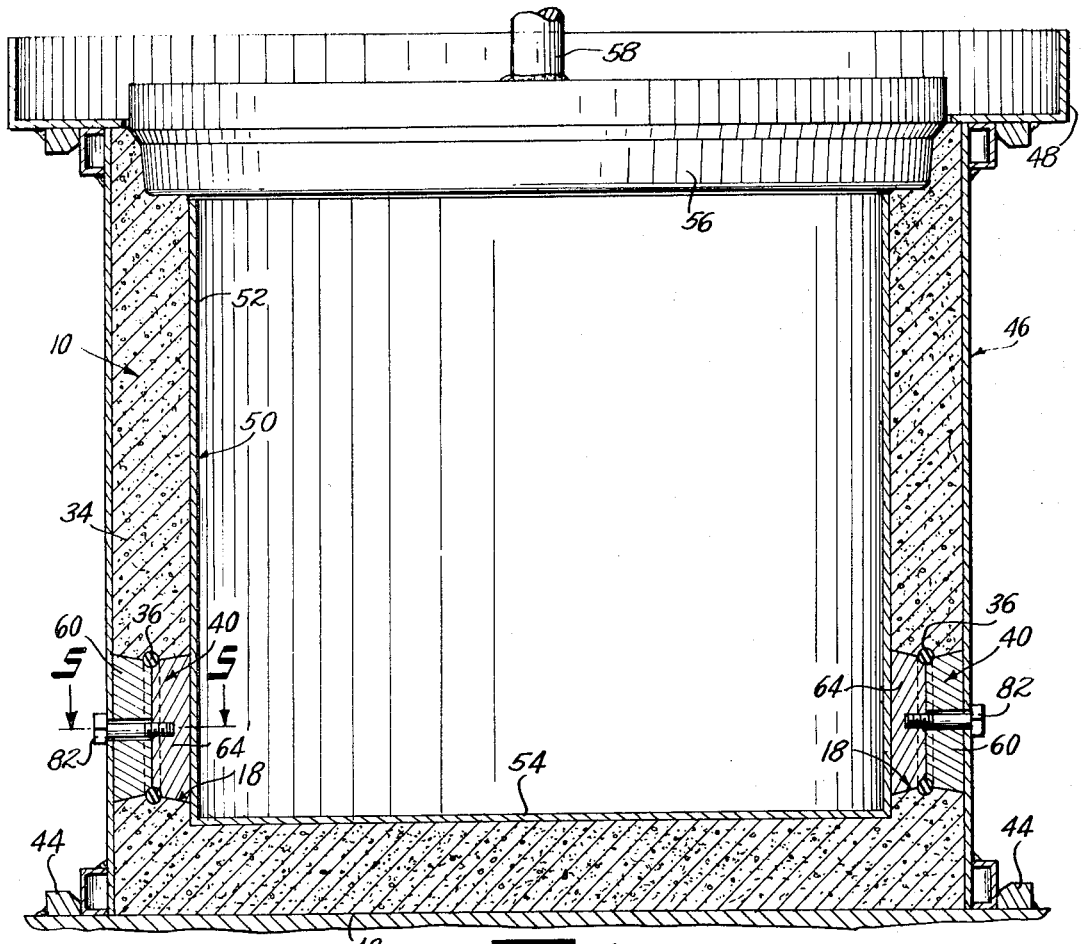
FIG. 4 is an enlarged fragmentary vertical sectional view of an apparatus for forming a manhole with openings for use in the method and arrangement of the invention, and showing the novel two-part mold blank of the invention mounted in place between inner and outer shell molds.

Referring now to FIG. 1 of the drawings, a manhole or underground vault is indicated at 2 buried in the earth 4 beneath road pavement 6. The present invention contemplates that the manhole 2 would be used with a buried sewer line 8, but it is to be understood that the invention would also extend to joints between an underground electric utility vault and associated conduit structures, and similar vault arrangements. Indeed, the joint method and arrangement of the invention could also be used above ground, in applications similar to a manhole.

The manhole or vault 2 is made from concrete, and includes a lower section 10, one or more intermediate sections 12, and an entrance cone section 14 equipped with a removable cover 16 that preferably lies flush with the surface of the road pavement 6. While the manhole sections can be constructed on site or even in situ, such are today commonly precast in a factory and then moved to the site.

Referring now to FIGS. 2 and 3 in particular, the lower manhole section 10 is equipped with two diametrically aligned pipe openings 18, it being understood that the number and location of such opening is a matter of choice. The manhole 2 is intended as an access point in the sewer line 8, and the openings 18 are respectively arranged to connect the male and female ends 20 and 22 of pipe sections 24 and 26, respectively, comprising part of the pipeline 8. The openings 18 are identical, and each comprises a pair of flared portions 28 that taper uniformly downwardly from the inner and outer surfaces 30 and 32 of the wall 34 of the concrete manhole lower section 10.

Medially thereof, each opening 18 has an annular O-ring 36 of resilient material mounted therein, about the outer half of the normally circular in cross-section O-ring seal 36 being seated in a semi-circular annular groove 38 formed in the sidewall of the opening 18. Thus, about one-half of the circular cross-section of the annular O-ring 36 projects radially into the opening 18. For the invention to function best, the O-ring 36 must be as truly circular as possible and must be accurately positioned within the opening 18. To accomplish this, a unique two-part blind is utilized to form the opening 18 and cast the O-ring 36 in situ during manufacture of the lower manhole section 10, said blind being indicated at 40 in FIGS. 4–6.

Figure 5:
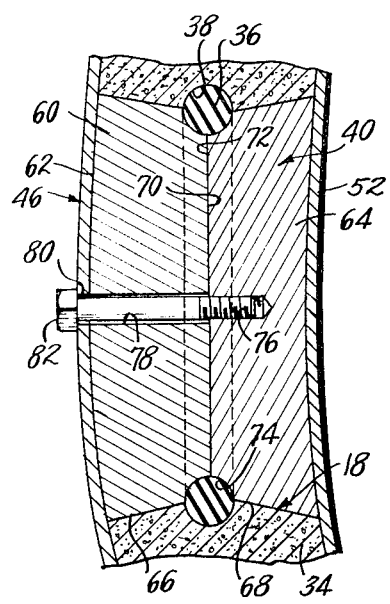
FIG. 5 is an enlarged fragmentary sectional view taken on the line 5—5 in FIG. 4, showing details of the mold blank.
Figure 6:
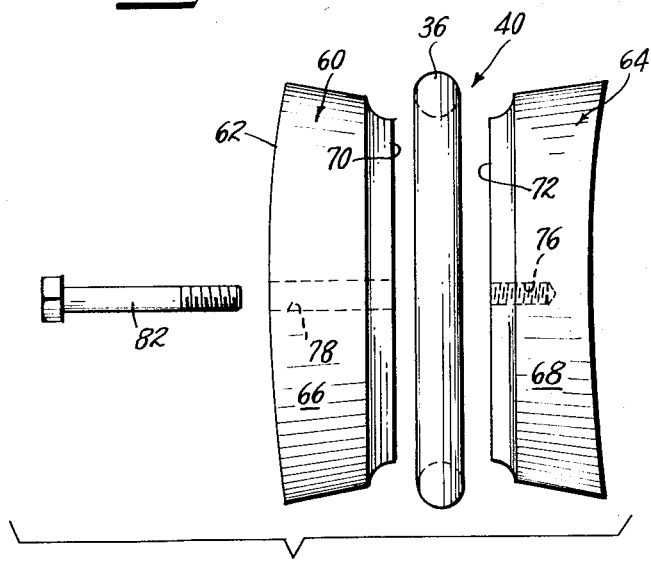
FIG. 6 is an exploded view of the mold blank of the invention.

Referring now to FIGS. 4–6, there is shown therein typical mold apparatus for constructing a lower manhole section 10, and which utilizes the blind 40 to properly form each opening 18 whereby to carry out the first step of the method of the invention. The mold apparatus indicates a table 42 having stops 44 thereon for receiving and holding an outer cylindrical shell mold 46, the table 42 normally having a shaker or vibrator (not shown) connected thereto to aid in settlement of the wet or damp concrete mix. The upper end of the outer shell mold 46 has a mix receiving tray 48 fitted thereon, and mounted concentrically within said mold 46 is an inner cylindrical shell 50 including a sidewall 52 and a bottom wall 54. Wet or damp concrete mix is poured between the two shells 46 and 50, is distributed by vibration of the work table 42, and is shaped at the upper end by a rotating trowel 56 carried by a shaft 58, as is known in the art.

The blind 40 is intended to be mounted between the inner and outer shells 50 and 46, and includes an outer part 60 having a convex outer surface 62 conforming to the curvature of the inner wall of the outer shell 46, and an inner part 64 having a concave outer surface conforming to the inner shell wall 52. The blind parts 60 and 64, respectively, have frusto-conical peripheral surfaces 66 and 68 and flat inner end faces 70 and 72. A semi-circular in cross-section annular groove 74 is formed at the outer peripheries of the abutted flat end faces 70 and 72, one half of the groove 74 being carried by each part 60 and 64.

The inner blind part 64 has a threaded bore 76 centrally therein, and the outer part 60 has a bore 78 that is aligned with the threaded bore 76 when the blind 40 is properly assembled. The outer shell 46 is provided with bores 80 at each point where a pipe opening is to be formed, and the two-part mold 40 with an O-ring gasket or seal 38 carried in the groove 74 thereon is secured between the shells 46 and 52 by a bolt 82 passed through the bores 80 and 78 and threaded into the bore 76.

With the blinds 40 in place between the molds 46 and 50, concrete mix is poured between the molds and allowed to harden. The bolt 82 is then removed, after which the inner and outer shells 50 and 46 are stripped. The two blind parts 60 and 64 are then removed, leaving a smooth double-flared opening 18 with a centrally positioned resilient O-ring seal 36 firmly seated therein within a groove 38. Because the surfaces 66 and 68, the groove 74, and the end faces 70 and 72 are all accurately dimensioned, and because the O-ring 36 is fully supported by the blind in a circular configuration, the resultant opening 18 is also of precise dimensions, and the radially projecting O-ring is as nearly circular as it is possible to obtain in a concrete molding operation.

Returning now to FIGS. 1–3, the completed lower manhole section 10 is installed within a dug pit, with the pipe openings 18 in as near alignment with the axis of the pipeline 8 as possible, without spending a great amount of time making precise adjustments in location. Because the present joint can accommodate limited variations in alignment, the great care required in the past to ensure accurate alignment need not be taken. The pipeline 8 is then laid up to within one length or less from the manhole 2, whereupon the next step in the procedure is begun.

The final female segment of pipe 26 is cut on its male end so that it will fall short of the manhole 2. The pipe 26 can be of concrete or other material and is fitted at its socket end, either on site or previously at the factory, with a connector pipe section 84 secured by a suitable adhesive or cement 85. The connector pipe section 84 has a diameter somewhat greater than the inner diameter of the O-ring seal or gasket 36, and the outer surface thereof is carefully dimensioned and shaped to be circular, smooth and of substantially uniform diameter throughout. Typically, the section 84 will be made of PVC or other suitable plastic, and the outer surface thereof will be protected against damage until installation time.

The pipeline section 26 is installed by first inserting the connector section 84 through its associated opening 18, the exterior surface of the section 84 being coated with gasket lubricant if needed. Then the pipe 26 is manipulated until the male end thereof is finally joined into the pipeline 8, the double-flared opening 18 and the O-ring 36 allowing such manipulation to occur. Once the pipe 26 is in place, the circular O-ring gasket 36 in engagement with the smooth, circular, uniform diameter connector section 84 will form an effective seal, even if the connector section 84 lies at an angle to the axis of the opening 18. It is because of this relationship that variations in alignment can be accommodated without losing effectiveness of the joint, and this ability makes for obvious ease of installation, and can accommodate later shifting because of soil settlement or the like.

The male end of the pipe section 24 is similarly fitted with a like connector sleeve or section 86, secured to a collar 88 by cement or adhesive 90, the collar 88 fitting over the male end of the pipe 24 with a gasket 92 therebetween, if desired. The pipe 24 is installed like the pipe 26, and obviously the connector sections 84 and 86 can be secured to their respective pipes in any desired manner.

In order to better explain the invention, and not by way of limitation, the specifications for a typical installation would be as follows. Typically, an O-ring made of rubber with a durometer hardness of about 40 to 45 would be employed. For an 8-inch connector section, an O-ring with a cross-section diameter of 1⅛ inch and which compresses by about 3/16 inch on insertion of the connector sections 84 or 86 would be suitable. In such an installation the openings 18 should be flared at about 10°, thus allowing for misalignments up to this magnitude.

From the foregoing, it is seen that a joint arrangement and method has been provided which satisfies all of the objects herein above set forth, and which allows the use of labor with limited skills to install manholes and connect conduits thereto. It should be noted that when the manholes are premanufactured and the final pipe sections 24 and 26 are fitted with their connector sections 86 and 84 at the factory, the only tools that may be required on site are cutters to cut the pipes to proper length. Further, even then cuts can be made with wide tolerance, over the length of the sections 84 and 86.

It should be noted that the pipe sections 24 and 26 as shown in the drawings are contemplated to be of a material that can be easily cut in the field, such as asbestos cement. Asbestos cement sewer pipe has a rough exterior of varying dimensions, which fact is rendered immaterial for the present joint by use of the PVC connector sections 84 and 86. If PVC sewer pipe is used in place of the asbestos cement pipe, then of course the separate connector sections 84 and 86 may not be needed at all, assuming a smooth exterior of uniform dimensions.

Further, where clay or concrete sewer pipe is used, it is to be understood that such is difficult to cut in the field. With such pipe one section thereof would be fitted at the factory with a PVC connector section 84 having a length about as long as the pipe section, and the PVC section would then be cut in the field to the proper length. In this instance a section 24 made of clay or concrete would be factory-fitted with a PVC connector section 86 about one foot in length.

Obviously, many modifications and variations of the invention are possible.

I claim:

1. A method for connecting the end of a pipe section of a pipeline with a manhole, having a wall defining a manhole chamber, comprising the steps of:

forming a pipe opening through said wall of said manhole communicating with said chamber, said pipe opening being bounded by a wall surface and said wall surface having a resilient sealing ring seated and retained thereon with said ring projecting radially inwardly into said pipe opening;

joining a first end of said pipe section with a connector pipe section, said connector pipe section having an outer diameter greater than the inner diameter of said sealing ring and smaller than the diameter of said opening;

inserting the free end of said connector pipe section through said pipe opening beyond said sealing ring, said connector pipe section compressing said sealing ring radially; and manipulating said connector pipe section and pipe section to bring the opposite end of said pipe section into engagement with the next pipe section of said pipeline.

2. The method as recited in claim 1, wherein said sealing ring is a circular O-ring.

3. The method as recited in claim 1, wherein said pipe opening is formed with a double flare to allow angular displacement of said connector section.

4. A method as recited in claim 1, wherein said connector pipe section has a smooth exterior surface of substantially uniform diameter.

5. A method as recited in claim 1, wherein said resilient sealing ring is seated centrally of said wall surface.

6. A method as recited in claim 3, wherein said sealing ring is seated at the apex of said double flare at the axial position of said opening with the smallest diameter.

7. A method as recited in claim 1, wherein said wall surface is formed with a groove for retaining said resilient sealing ring.

8. A method as recited in claim 1, wherein said resilient sealing ring is cast in situ on said wall surface.

* * * * *